(12) United States Patent
Sankaran et al.

(10) Patent No.: US 7,614,539 B2
(45) Date of Patent: Nov. 10, 2009

(54) METHOD TO IMPROVE PROPERTIES OF ALUMINUM ALLOYS PROCESSED BY SOLID STATE JOINING

(75) Inventors: Krishnan K. Sankaran, St. Louis, MO (US); Richard J. Lederich, Des Peres, MO (US); Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 611 days.

(21) Appl. No.: 10/939,528

(22) Filed: Sep. 13, 2004

(65) Prior Publication Data

US 2006/0054252 A1 Mar. 16, 2006

(51) Int. Cl.
*C22F 1/04* (2006.01)
*B23K 20/12* (2006.01)
(52) U.S. Cl. .................................. 228/112.1; 148/535
(58) Field of Classification Search .............. 228/112.1, 228/2.1, 2.3, 46; 148/535
See application file for complete search history.

(56) References Cited

U.S. PATENT DOCUMENTS

| | | | |
|---|---|---|---|
| 6,660,106 B1 | 12/2003 | Babel et al. | |
| 2003/0005852 A1 | 1/2003 | Okamura et al. | |
| 2003/0116608 A1* | 6/2003 | Litwinski | 228/112.1 |
| 2004/0056075 A1 | 3/2004 | Gheorghe | |
| 2005/0011932 A1 | 1/2005 | Ehrstrom et al. | |

FOREIGN PATENT DOCUMENTS

| | | |
|---|---|---|
| EP | 0309087 A1 | 3/1989 |
| EP | 0350029 A1 | 1/1990 |
| EP | 1285707 A1 | 2/2003 |
| WO | WO 2004/104258 A1 | 12/2004 |

OTHER PUBLICATIONS

"ASM Handbook: vol. 2 Heat Treating" ASM International, 1991, p. 844-848,861-863,870-871.*
K.K. Sankaran & R.J. Lederich, Trends in Welding Research: Metallurgucal Characterization of Friction Stir Welded 7050-T74 and C458-T8 Aluminum Alloys, The Materials Information Society, ASM International, Apr. 15, 2002, Phoenix, Arizona, USA.
B. Capudean, Welding's Effect on Strengthening Steel, The Farbricator.Com, http://www2.thefabricator.com/Articles/Welding_Article.cfm?ID=796, Aug. 12, 2004.

(Continued)

*Primary Examiner*—Roy King
*Assistant Examiner*—Janelle Morillo
(74) *Attorney, Agent, or Firm*—Ostrager Chong Flaherty & Broitman P.C.

(57) ABSTRACT

A method for forming an aluminum alloy article having improved mechanical properties using a solid-state joining process in which the problem of ductility reduction is minimized by conducting a thermal exposure treatment prior to solution heat treatment. This thermal exposure treatment, done at a temperature below the solution heat treatment temperature, releases stored energy in the aluminum-alloy material. The aluminum-alloy material then does not have sufficient energy to cause recrystallization and abnormal grain growth during the subsequent solution heat treatment process. The resultant aluminum-alloy material has a restored mechanical strength with only a minor, but acceptable, decrease in original ductility.

12 Claims, 2 Drawing Sheets

OTHER PUBLICATIONS

F. Armao, The Skinny On Aluminun Welding, MetalForming, Jun. 2000, pp. 44-48.

Rockwell Scientific, Friction Stir Processing & Joining, Rockwell Scientific, http://www.rsc.rockwell.com/structural_materials/frictionstir.html, Aug. 27, 2004.

F. Armao, Frequently Asked Questions in Aluminum Welding, Lincoln Electric, http://www.lincolnelectric.com/knowledge/articles/content/alumfaq.asp, Aug. 12, 2004.

Y.S. Sato, et al., Microtexture in the Friction-Stir Weld of an Aluminum Alloy, Metallurgical and Materials Transactions A, vol. 32A, Apr. 2001, 941.

Twi, Friction Stir Welding—Superior Weld Quality, TWI, http://www.twi.co.uk/j32k/unprotected/band_1/fswqual.html, Aug. 27, 2004.

P. Threadgill, Linear Friction Welding, TWI, http://www.twi.co.uk/j32k/protected/band_3/ksplt001.html, Jul. 22, 2004.

Friction-Stir Welding, Webster's Online Dictionary http://www.webster-dictionary.org/definition/Friction-stir%20welding, Aug. 27, 2004.

esp@cenet, Abstract of WO 2004/104258 A1, http://www/v3.espacenet.com/textdoc?DB=EPODOC&IDX=WO2004104285&F=0&QPN=WO..., Feb. 14, 2006.

J. Westhof, "High Strength Al-Zn-Mg alloy Structure and the Relation of Strength Property and Aging Condition", Aluminum, 1991, No. 4, p. 350-354 (translated into Chinese language by Yuxin Zhang, Light Alloy Fabrication Technology, 1993, vol. 21(10), p. 44-47).

Qing Wang, etc., "Vibration Model and Dynamic Analysis of Linear Friction Welding Machine", Aeronautical Manufacturing Technology, 2002, vol. 8, p. 33-36.

* cited by examiner

METHOD TO IMPROVE PROPERTIES OF ALUMINUM ALLOYS PROCESSED BY SOLID STATE JOINING

TECHNICAL FIELD

The present invention generally relates to a method for preparing aluminum alloys and more specifically to a method to improve the properties of aluminum alloys processed by solid state joining.

BACKGROUND ART

The worldwide acceptance of the economic benefits and high weld quality produced when using solid state joining techniques, including for example conventional rotary friction, to produce joints in round section metallic components has led to the development of other high weld quality processes for joining non-round and complex shaped parts.

One newly developed process related to rotary friction welding, called linear friction welding ("LFW"), involves rubbing one component across the face of a second rigidly clamped component using a balanced, linear reciprocating motion. The linear reciprocating motion generates frictional heat and softening of the material at the weld interface that is expelled as flash. The two components are brought into perfect alignment towards the end of the weld cycle, and the welding force is maintained or increased to consolidate the joint. Machining or grinding can subsequently remove flash produced during the LFW process. The advantage to the LFW process over conventional rotary friction processes is that non-round or complex geometry components, such as aircraft engine blades to discs, can be welded using LFW.

Friction stir welding ("FSW") is a solid-state process that uses a nonconsumable tool to join various types of metals. When a FSW rotating tool is inserted into and traverses through the materials, the tool plasticizes the materials and forces the materials to flow around the tool where they reconsolidate.

While processes such as FSW and LFW have found popularity in various industries, the processes do have drawbacks. Age-, work-, or strain-hardened metals exposed to the intense localized heat of welding tend to recrystallize and soften in the weld nugget because the strengthening precipitates have dissolved. The weld nugget can be strengthened by performing a post weld aging treatment that reprecipitates these strengthening precipitates. Welding also results in a heat-affected zone (HAZ) that surrounds the nugget. Whereas the nugget attains a high enough temperature to cause the precipitates to solutionize, the HAZ is heated to a lower temperature that causes the precipitate to grow in size and become less effective in strengthening. Post weld aging only further coarsens these precipitates.

For example, both FSW and LFW reduce the strength of commonly used aluminum alloys (such as 7050 and 7055) by locally altering the microstructure and temper (In friction welded aluminum, for example, the friction welding process reduces the microstructure to a grain size of about 2-5 micrometers, which is much finer than the parent material). In fact, a strength degradation of about 25-30% typically occurs because of overaging in the HAZ. The nugget will initially be weaker, but will gradually strengthen by virtue of natural aging at room temperature.

For example, as shown in Table 1 below, for one type of aluminum alloy (7050-T7451), the linear friction welding and subsequent aging resulted in a drop in allowable ultimate tensile stress (Ftu) of about 15%, a drop in the allowable tensile stress at which the material starts to yield in tension (Fty) of about 27%, and a drop in percent elongation of about 35-45%.

| Condition | Fty (ksi) | Ftu (ksi) | % Elongation |
|---|---|---|---|
| 7050-T7451 Parent Metal | 63 | 74 | 7.5 |
| 7050-T7451 Linear Friction Welded and Aged | 46 | 63 | 4–5 |

It is impossible or impractical to restore these strength properties by further mechanical processing, which severely limits the usefulness and applicability of these aluminum alloys in low-cost manufacturing process, especially for use in airframe components.

One technique for recovering the strength of these aluminum alloys altered during the FSW or LFW process is to further heat treat the alloys using solution heat treating (at temperatures between about 900 and 1000 degrees Fahrenheit), quenching and aging (at temperatures ranging from about 250-350 degrees Fahrenheit). However, while the solution heat treatment step is necessary for the recovery of strength, it also results in excessive growth of the grains (from about 4 to 400 micrometers) of the weld itself and significantly degrades ductility, frequently to levels approaching zero.

This excessive grain growth and loss of ductility is thought to occur because the friction welded blocks contain considerable amounts of stored energy, which causes secondary recrystallization and abnormal grain growth to occur during the solution treatment step.

It is thus highly desirable to recover the strength of aluminum alloys lost during FSW, LFW or similar solid-state processes while preventing the resultant loss in ductility.

SUMMARY OF THE INVENTION

The present invention solves the problem of ductility reduction by conducting a thermal exposure treatment prior to solution heat treatment. This thermal exposure treatment, or post-weld annealing, is done at a temperature below the solution heat treatment temperature and releases stored energy in the material. The material then does not have sufficient energy to cause recrystallization during the subsequent solution heat treatment process. The resultant material has a restored mechanical strength with only a minor, but acceptable, decrease in original ductility.

While the process is ideally used to join aluminum alloys parts, the present invention is suitable for use in joining any types of metal.

Other features, benefits and advantages of the present invention will become apparent from the following description of the invention, when viewed in accordance with the attached drawings and appended claims.

BEST MODES FOR CARRYING OUT THE INVENTION

Figure 1:
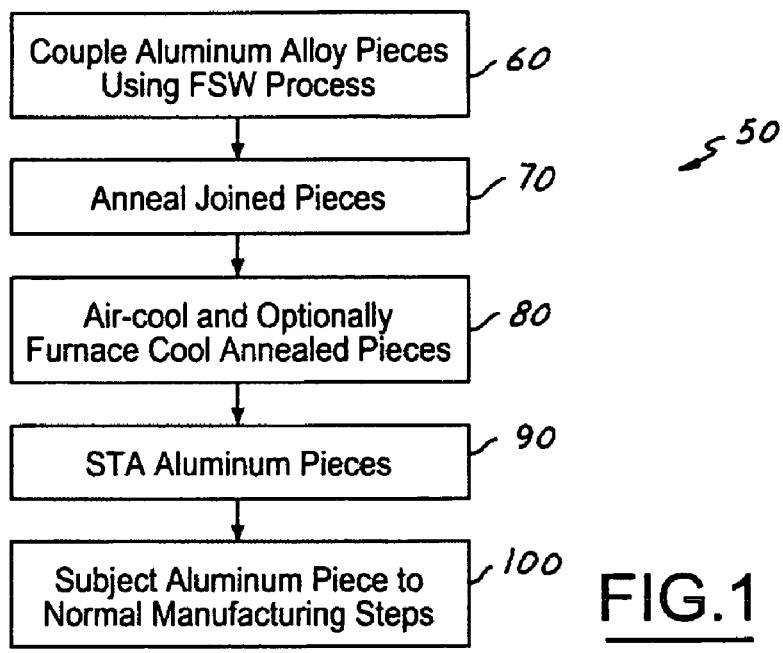
FIG. 1 is logic flow diagram for forming an aluminum alloy article using a solid state joining process according to one preferred embodiment of the present invention.

Referring now to FIG. 1, logic flow diagram and diagram for producing an aluminum alloy article utilizing a solid state joining process is shown generally as 50.

The process starts in Step 60 by coupling together two parts 12, 14 of aluminum alloy using a conventional friction stir welding ("FSW") process.

Figure 2A:
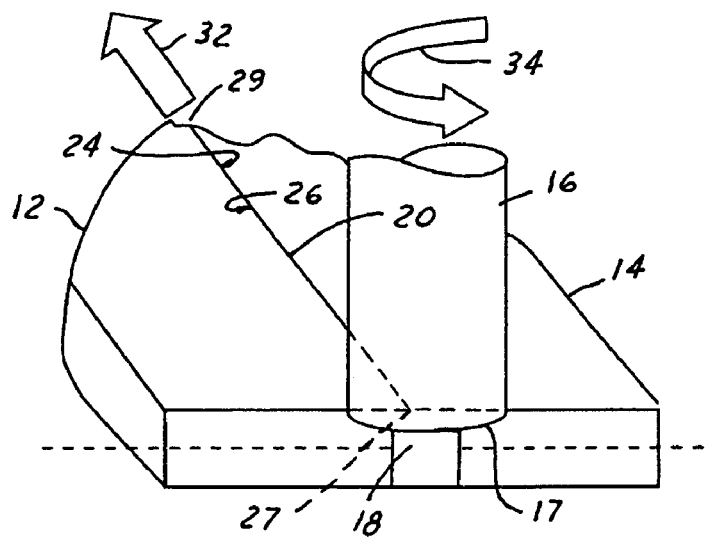
FIG. 2A is a perspective view of a friction stir welding tooling device used in FIG. 1 according to a preferred embodiment of the present invention prior to the welding process.
Figure 2B:
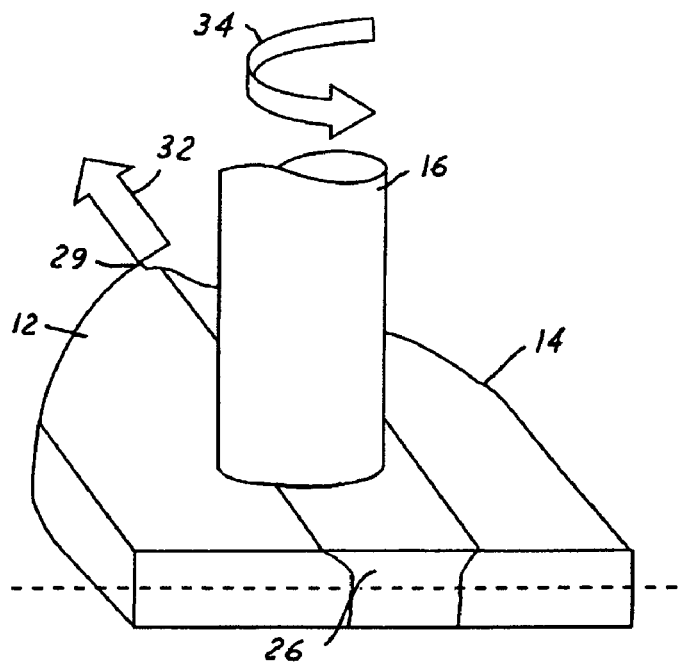
FIG. 2B is a perspective view of a friction stir welding tooling device of FIG. 2A after it has traversed along a portion of the joint line.

As best shown in FIGS. 2A and 2B, in a conventional FSW process, a cylindrical-shouldered friction stir welding tool 16, with a profiled threaded/unthreaded probe (nib) 18 is rotated at a constant speed and fed at a constant traverse rate into the joint line 20 between two parts 12, 14 of sheet or plate aluminum material, which are butted together. As best shown in FIG. 2A, the parts 12, 14 have to be clamped rigidly onto a backing bar (not shown) in a manner that prevents the abutting joint faces 24, 26 from being forced apart while the nib 18 is placed at a position along the joint line 20. The nib 18 is then rotated at a constant rate (shown by arrow 34) as the tool 16 traverses along the joint line 20 (shown by arrow 32) from a first end 27 to a second end 29, therein generating frictional heat between the wear resistant welding tool shoulder 17 and nib 18, and the material of the work-pieces 12, 14. This heat, along with the heat generated by the mechanical mixing process and the adiabatic heat within the material, cause the stirred materials to soften without reaching the melting point (hence cited a solid-state process), allowing the traversing of the tool 16 along the weld line 26. This is shown in FIG. 2B. The welding 8 of the material is facilitated by severe plastic deformation in the solid state involving dynamic recrystallization of the base aluminum material. The result is a joined aluminum-alloy material.

In Step 70, the joined aluminum-alloy material is annealed at a temperature about 100-300 degrees Fahrenheit below the solutionizing temperature of the aluminum-alloy material. The annealing dissipates stored energy in the weld nugget so that the subsequent solution treating and aging steps do not cause secondary recrystallization and abnormal grain growth. For aluminum alloys such as 7050-T7451 parent metal, the annealing is done at between 700 and 800 degrees Fahrenheit, and more preferably about 725 degrees Fahrenheit, for approximately 2 hours.

In Step 80, the annealed material is air cooled to between room temperature and 250 degrees Fahrenheit. As part of this process, the annealed material may optionally be furnace cooled to about 500 degrees Fahrenheit prior to air-cooling.

Next, in Step 90, the annealed aluminum-alloy material is solution treated and aged (STA) in a conventional manner. For aluminum alloys such as 7050 and 7055, a typical STA treatment consisting of subjecting the aluminum-alloy material to a solutionizing temperature of between 850 and 1000 degrees, and more preferably about 890 degrees Fahrenheit, for about 1 hour, followed by a quenching step. The quenched material is then subsequently aged for about 4 hours at 250 degrees Fahrenheit and followed by a final aging step at 350 degrees Fahrenheit for about 8 hours.

In Step 100, the aluminum-alloy material is subjected to normal manufacturing steps associated with typical aerospace articles or components, such as fastening, chemical processing, and machining, including but not limited to cold-working and cold-forming, but not requiring the associated thermal or heat-treatment steps. These manufacturing steps form the part to its approximate final shape. The formed part is available for use in various articles of manufacture.

Figure 3:
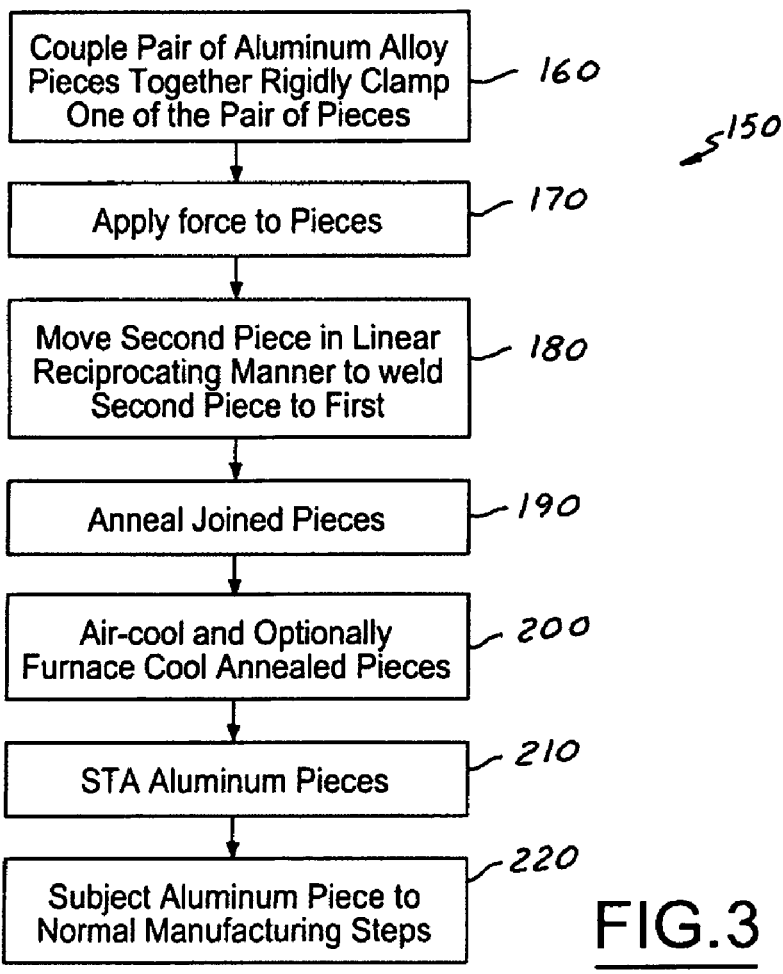
FIG. 3 is a logic flow diagram for forming an aluminum alloy article using a solid state joining process according to another preferred embodiment of the present invention.

Referring now to FIG. 3, an alternative logic flow diagram for producing an aluminum alloy article utilizing a solid state joining process is shown generally as 150.

Figure 4:
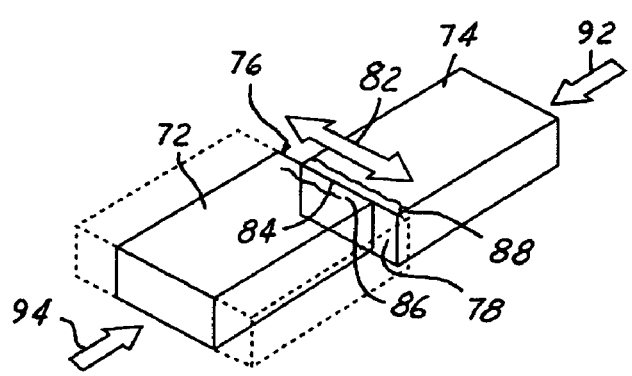
FIG. 4 is a perspective view of a linear friction welding process used in FIG. 3 according to a preferred embodiment of the present invention.

Beginning with Step 160, and shown best in FIG. 4, two pieces 72, 74 of aluminum-alloy material are brought in close proximity with each other such that a respective face 76, 78 is substantially abut. The first piece 72 is rigidly fixed (clamped), while the second piece 74 is capable of linear reciprocating movement.

In Step 170, a force is applied to each respective piece as represented by arrows 92, 94. While a wide range of friction and forged pressure may be utilized, a preferred embodiment of the present invention utilizes a friction pressure of about 50 Newtons per square millimeter and a forge pressure of about 100 Newtons per square millimeter.

In Step 180, the second piece 74 is moved in a linear reciprocating motion, as shown by arrows 82, therein causing the faces 76, 78 to rub together. The linear reciprocating motion generates frictional heat and softening of the material at the weld interface 84 defined by the respective faces 76, 78, therein creating a weld nugget 86 of softened material. A portion of the weld nugget 86, or flash 88, is expelled from the weld interface 84 and trimmed or machined off. For aluminum alloys using the preferred friction and forge pressures describe above, the reciprocating motion has a small amplitude of +/−1-3 mm, and more preferably +/−2 mm, at a frequency of between about 25-125 Hertz, and more preferably 40 Hertz.

In step 190, the shaped aluminum-alloy material is annealed. The annealing dissipates stored energy in the weld nugget so that the subsequent aging steps do not cause secondary recrystallization and abnormal grain growth. The annealing is done at about 100-300 degrees Fahrenheit below the solutionizing temperature of the aluminum-alloy material. For aluminum alloys such as 7050, the annealing is done preferably between 700 and 800 degrees, and more preferably at about 725 degrees Fahrenheit, for approximately 2 hours.

In Step 200, the annealed material is air cooled to between room temperature and 250 degrees Fahrenheit. As part of this process, the annealed material may optionally be furnace cooled to about 500 degrees Fahrenheit prior to air-cooling.

Next, in Step 210, the annealed aluminum-alloy material is solution treated and aged in a conventional manner. For aluminum alloys such as 7050 and 7055, a typical STA treatment consisting of subjecting the aluminum-alloy material to a solutionizing temperature of between 850 and 1000 degrees, and more preferably about 890 degrees Fahrenheit, for about 1 hour, followed by a quenching step. The quenched material is then subsequently aged for about 4 hours at 250 degrees Fahrenheit and followed by a final aging step at 350 degrees Fahrenheit for about 8 hours.

In Step 220, the aluminum-alloy material is subjected to normal manufacturing steps associated with typical aerospace articles or components, such as fastening, chemical processing, and machining, including but not limited to cold-working and cold-forming, but not requiring the associated thermal or heat-treatment steps. These manufacturing steps form the part to its approximate final shape. The formed part is available for use in various articles of manufacture.

The present invention solves the problem of ductility reduction by conducting a thermal exposure treatment prior to solution heat treatment. This thermal exposure treatment, or post-weld annealing, is done at a temperature below the solution heat treatment temperature and releases stored energy in the material. The material then does not have sufficient energy to cause recrystallization during the subsequent solution heat treatment process. The resultant material has a restored mechanical strength with only a minor, but acceptable, decrease in original ductility.

For example, as shown in Table 2 below, a comparison is made of the mechanical properties for one type of aluminum alloy (7050-T7451). Row 1 indicates the mechanical properties of the alloy in its natural state. Row 2 describes the same mechanical properties for the aluminum alloy that has been joined by linear friction welding process and aged according to the prior art. Row 3 lists the mechanical properties where the alloy has been solution treated and aged after linear friction welding according to the prior art. Row 4 adds the annealing step that is the subject of the present invention prior to the solution treating and aging step. The resultant mechanical properties are summarized in Table 2:

| Condition | Fty (ksi) | Ftu (ksi) | % Elongation |
|---|---|---|---|
| 7050-T7451 blocks of Parent Metal | 63 | 74 | 7.5 |
| 7050-T7451 blocks, linear friction welded and aged | 46 | 63 | 4–5 |
| 7050-T7451 blocks, linear friction welded, and solution treated and aged | 61 | 67 | 0.3 |
| 7050-T7451 blocks, linear friction welded, annealed for 2 hours at 725 degrees Fahrenheit, and solution treated and aged | 70 | 75 | 3–7.5 |

As Table 2 indicates, tensile strength tests across the welds and HAZ's where the post-weld annealing step was utilized, showed dramatic improvement. The nugget allowable ultimate tensile stress (Ftu) was 75 ksi and allowable tensile stress at which the material starts to yield in tension (Fty) was 70 ksi, while the percent elongation was between 3-7.5%, which is substantially similar to the starting material described in Row 1 and drastically improved from the typical aging process as shown in Row 2 and the typical solution treating and aging process as shown in Row 3. Thus, the annealing process allowed recovery of the mechanical properties lost during solid state joining process such as linear friction welding.

The present invention thus discloses a method to release the energy created during solid state joining processes such as LFW or FSW that is stored in the joined material. Thermal exposure at a temperature about 100 to 300 degrees Fahrenheit below the solution heat treatment temperature releases this stored energy. This temperature range is high enough to cause release of energy but low-enough to avoid recrystallization and/or grain growth during subsequent solution heat treatment, quenching and aging. The aluminum alloy articles are joined with only a minor, but acceptable, decrease in the original ductility (typically between about 8 and 12%).

While the process is ideally used in conjunction with solid state process used to join aluminum alloys parts, the present invention is suitable for use in joining any types of metal or alloys utilizing a solid state process.

While the invention has been described in terms of preferred embodiments, it will be understood, of course, that the invention is not limited thereto since modifications may be made by those skilled in the art, particularly in light of the foregoing teachings.

What is claimed is:

1. A method for forming an aluminum-alloy article processed by linear friction welding having improved ductility and elongation, the method consisting of:
   providing a pair of pieces of an aluminum alloy material;
   forming an aluminum alloy material using a linear friction welding process;
   annealing the joined aluminum alloy material to release stored energy created during linear friction welding within said aluminum alloy material at about 725 degrees Fahrenheit for a sufficient period of time to release said stored energy within said aluminum alloy material;
   cooling said aluminum alloy material; and directly thereafter
   solution treating and aging said aluminum alloy material to form the aluminum-alloy article;
   wherein said solution treating and aging said aluminum alloy material comprises:
   heating said aluminum alloy material to a solutionizing temperature; holding said aluminum alloy material at said solutionizing temperature for a predetermined amount of time; quenching said aluminum alloy material; and aging said aluminum alloy material at between about 250 and 350 degrees Fahrenheit.

2. The method of claim 1, wherein annealing said aluminum alloy material comprises annealing said aluminum alloy material at about 725 degrees Fahrenheit for about 2 hours.

3. The method of claim 1, wherein cooling said aluminum alloy material comprises air-cooling said aluminum alloy material to between about room temperature and about 250 degrees Fahrenheit.

4. A method for forming an aluminum-alloy article processed by linear friction welding having improved ductility and elongation, the method consisting of:
   providing a pair of pieces of an aluminum alloy material;
   forming an aluminum alloy material using a linear friction welding process;
   annealing the joined aluminum alloy material to release stored energy created during linear friction welding within said aluminum alloy material at about 725 degrees Fahrenheit for a sufficient period of time to release said stored energy within said aluminum alloy material;
   furnace cooling said aluminum alloy material to about 500 degrees Fahrenheit;
   cooling said aluminum alloy material; and directly thereafter
   solution treating and aging said aluminum alloy material to form the aluminum-alloy article;
   wherein said solution treating and aging said aluminum alloy material comprises: heating said aluminum alloy material to a solutionizing temperature; holding said aluminum alloy material at said solutionizing temperature for a predetermined amount of time; quenching said aluminum alloy material; and aging said aluminum alloy material at between about 250 and 350 degrees Fahrenheit; and wherein cooling said aluminum alloy material comprises air-cooling said aluminum alloy material to between about room temperature and about 250 degrees Fahrenheit.

5. The method of claim 1, wherein aging said aluminum alloy material comprises aging said aluminum alloy material for about 4 hours at 250 degrees Fahrenheit followed by a final aging step at about 350 degrees Fahrenheit for about 8 hours.

6. The method of claim 1, wherein heating said aluminum alloy material to a solutionizing temperature and holding said aluminum alloy at said solutionizing temperature comprises heating said aluminum alloy material to about 890 degrees Fahrenheit for 1 hour.

7. The method of claim 1, wherein forming an aluminum alloy material using said linear friction welding process comprises:
   providing a pair of pieces of an aluminum alloy material; and
   joining one of said pair of aluminum alloy pieces to the other of said pair of said pieces by
      rigidly fixing a first one of said pair of aluminum alloy pieces;
      coupling a second one of said pair of aluminum alloy pieces such that a first face of said first one closely couples a second face of said second one;
      applying a first force on said second one of said pair of aluminum alloys such that said first face substantially abuts said second face, therein defining a weld interface;
      moving said second one of said pair of aluminum alloy pieces in a linear reciprocating fashion at a first frequency and a first amplitude such that said second face rubs against said first face and creates a weld nugget along said weld interface.

8. The method according to claim 7, wherein said first force comprises a friction pressure of about 50 Newtons per square millimeter and further comprises a forge pressure of about 100 Newtons per square millimeter.

9. The method of claim 7, wherein said first amplitude is between about +/−1-3 millimeters.

10. The method of claim 7, wherein said first frequency is between about 25 and 125 Hertz.

11. A method for improving the ductility of aluminum alloy articles formed by a linear friction welding process, the method consisting of linear friction welding releasing stored energy created during said linear friction welding process within the aluminum alloy material to substantially prevent recrystallization of the aluminum alloy material occurring in a subsequent solutionizing step by annealing the aluminum alloy material at a first temperature of about 725 degrees Fahrenheit for a first period of time sufficient to release said stored energy within the aluminum alloy material, said first temperature being below the solutionizing temperature of the aluminum alloy material solution treating and aging said aluminum alloy material.

12. The method of claim 11, wherein annealing the aluminum alloy material comprises annealing the aluminum alloy material at about 725 degrees Fahrenheit for about 2 hours.

* * * * *

UNITED STATES PATENT AND TRADEMARK OFFICE
CERTIFICATE OF CORRECTION

PATENT NO.        : 7,614,539 B2                                         Page 1 of 1
APPLICATION NO. : 10/939528
DATED             : November 10, 2009
INVENTOR(S)       : Sankaran et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Nineteenth Day of October, 2010

David J. Kappos
*Director of the United States Patent and Trademark Office*